C. M. MILLS.
TIRE TOOL.
APPLICATION FILED JAN. 8, 1914.
1,156,167.
Patented Oct. 12, 1915.
2 SHEETS—SHEET 1.
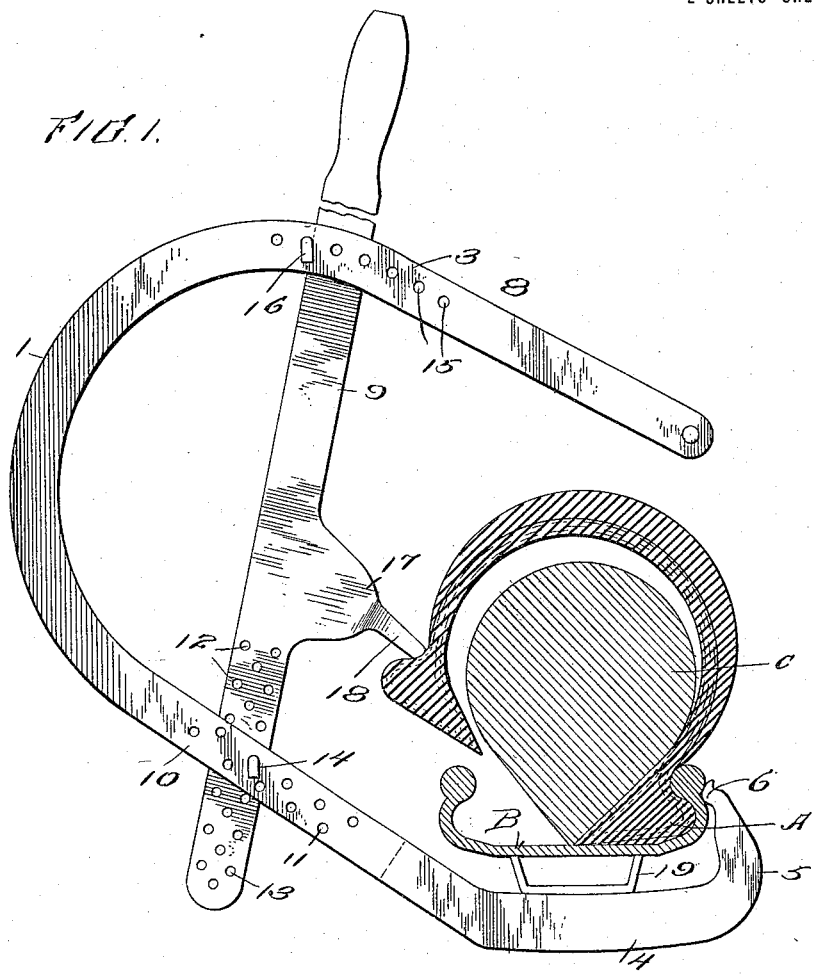
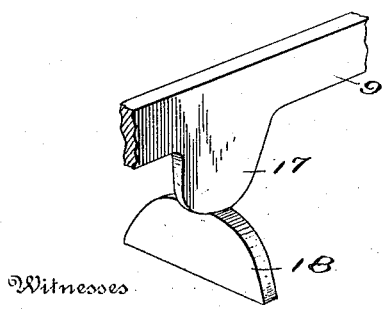
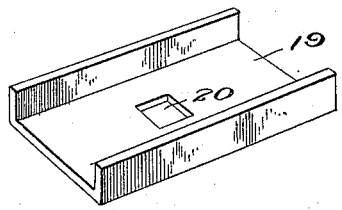
Witnesses
Inventor
Clarence M. Mills;
By
Attorney

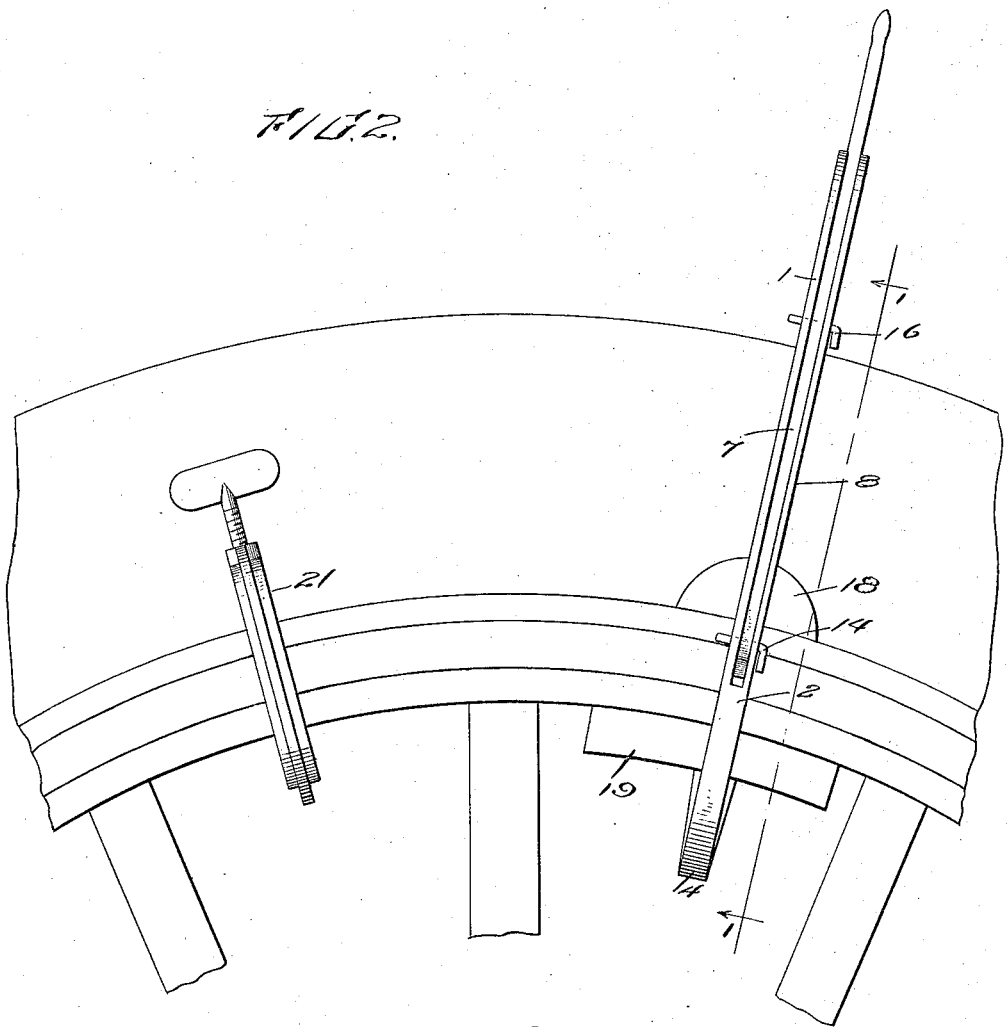
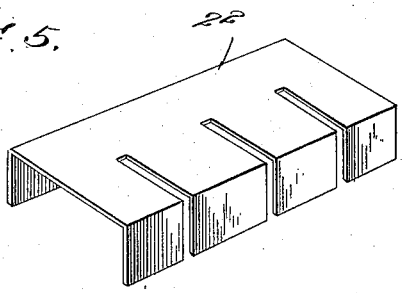

UNITED STATES PATENT OFFICE.

CLARENCE M. MILLS, OF PHILLIPSBURG, KANSAS, ASSIGNOR TO THE ESSENKAY PRODUCTS COMPANY, OF CHICAGO, ILLINOIS, A CORPORATION OF ILLINOIS.

TIRE-TOOL.

1,156,167.  Specification of Letters Patent.  Patented Oct. 12, 1915.

Application filed January 8, 1914. Serial No. 811,023.

*To all whom it may concern:*

Be it known that I, CLARENCE M. MILLS, a citizen of the United States, residing at Phillipsburg, in the county of Phillips and State of Kansas, have invented certain new and useful Improvements in Tire-Tools, of which the following is a specification.

This invention relates to improvements in tools or devices for attaching or applying tires especially to the wheels of automobiles, motor cycles, etc., as well as for removing the tires.

The invention therefore consists of certain structural features substantially as hereinafter fully disclosed and defined by the appended claims.

In the accompanying drawings is illustrated the preferred embodiment of my invention, wherein it will be understood that various changes and modifications may be made as to the detailed construction and arrangement of parts without departing from the spirit of the invention, and in which drawings—
Figure 1 is a front view of my tool or device and a transverse section of a tubular rubber tire, with the tool or device shown as applied in assembling the tire and clencher member of the rim or felly, the section referring to being taken on the line 1—1 of Fig. 2. Fig. 2 is a fragmental side view of the parts disclosed by Fig. 1 and added parts. Fig. 3 is a fragmental perspective view of the free end of the manually actuated lever for engaging the initially free edge or flange of the tire for holding it in position. Fig. 4 is a perspective view of a "bridge"-member or bearing. Fig. 5 is a similar view of a modification of the latter.
In carrying out my invention, I employ a preferably approximately U-shaped member 1, one leg 2 thereof, however, having an inwardly inclined portion 4, the latter itself being abruptly inclined slightly inwardly, or at right angles to the portion 4, as at 5, and preferably terminated in what may be termed as a toe, the purpose of which structural outline will presently appear. The member 1 is also bifurcated, the greater portion of its length, as at 7, the resultant arms 8 thereof receiving between them a manually actuated lever 9, the fulcrum or pivot of which is adjustable or adapted to be shifted in the following manner: The arms 8 of the leg 2 of the member 1 are provided with coincident staggered series of perforations 10 and 11, intermediate the terminals of the straight portions thereof, said lever 9 also having near its pivot corresponding staggered series of perforations 12 and 13, a pin 14 being provided for insertion through registering or coincident perforations of said arms and lever. The arms 8 of the leg 3 of the member 1 are also provided with coincident series of adjusting perforations 15, through any registering two of which may be inserted a pin or stop 16 adapted to engage the nearer edge of the lever 9 to hold it at the requisite point of adjustment. The lever 9 is provided with an arm or extension 17 a short distance from its pivot extending slightly downwardly therefrom, said extension or arm being so formed that its free end will be edgewise, or at a right-angle thereto to adapt it to more readily engage the flange of the tire, as in effecting the rim and tire assembling operation, as presently more fully disclosed.

In using the tool or device, the tubular or solid elastic tire, in prone position, has one flange or edge, as A suitably inserted under or in connection with one beaded edge of the clencher member or rim B, and to this clencher member or rim is temporarily applied a bridge or bearing 19, the edges of its upstanding lateral portions being presented next thereto, as seen in Fig. 1, the tire of tubular or hollow type having inserted therein, after the removal of the inner tire, the usual filler or core-forming pieces C of suitable dimensions. The member 1 is now applied to the tire, its toe or upturned end 6 being initially engaged with the further beaded flange of the rim or clencher member B, said member 1 then being engaged with the bridge 19, as indicated in Fig. 1, it being understood, of course, that said member is under the control of the hand. The lever 9 is, by suitable adjustment of the pin 14 with respect to the required apertures of the series 10, 11, 12, 13 of the member 1 and the lever so adjusted as to engage the terminal 18 of the arm 17 with the opposite flange edge of the tire and by requisitely moving said lever, said tire flanged edge will be carried or forced into interlocked connection with the adjacent beaded flange of the clencher member or rim B, as is apparent, thus suitably or effectively securing or applying the tire in place upon the wheel-rim. It is observed that the core or filler members are preferably of the general outline or made to resemble the form of the ordinary Bologna sausage, and may be of various lengths, say from an inch to twenty-seven inches, these core or filler members filling the tire all the way around, thus doing away with inner filler-tubes. The bearing or bridge 19 may be provided with an opening 20 for the reception of a nut of a securing bolt of the rim, which may happen to be just at the point of locating the bridge or bearing. The bridge or bearing 19 is adapted to correspond in general outline to the surface or contour of the wheel-rim, as shown in Fig. 1. The series of adjusting perforations 10, 11, 12, 13, together with the pin 14, allow for effecting the relative adjustment of the member 1 and lever 9, with its tire engaging arm to accommodate tires of various sizes in effecting the assembling operation. Also by means of the series of perforations 15 in the member 1 and the pin or stop 16, the lever 9 may be retained in temporarily fixed position, while the operator may have the freedom of his hands for doing any other work required in connection with the application of the tire. Further, this tool or device may be used in putting filler in demountable rims, also it is observed that by means of the bridge or bearing 19 providing for arming or equipping the felly or rim, the latter is protected while working the tool, and that said bearing or bridge serves as a foundation for taking the resistance directly off the rim.

It is obvious that the tool or device is equally applicable for removing or detaching tires including the air-filled tires or pneumatic type, and which operation may be done in the minimum time and with facility.

As suggested by Fig. 5, a modified form of bridge or bearing 22 is employed in using the tool for applying the tire of a motorcycle, said bridge differing from the preferred form, as above described in having transverse slots 23 formed therein from and opening through a longitudinal edge thereof for the reception of the wheel-spokes, in inserting the bridge into position upon the rim, as will be readily understood.

I claim—

1. A device of the type described including an approximately U-shaped member having bifurcated legs, one end of said member being adapted to engage the rim of a wheel from the inner surface and a lever pivoted at one end to one leg of said U-shaped member, with its other end working between the bifurcated portions of the other leg thereof, said lever having an arm with one end arranged to engage a flanged edge of the tire of the wheel, and means for the retention of said lever between said bifurcated portions of said other leg of the U-shaped member.

2. A device of the type described, including an approximately U-shaped member with substantially parallel legs, both being downwardly inclined with respect to their position in use, the lower leg having in continuation of its inclined portion a horizontal portion to extend below the wheel-rim, said horizontal portion having an upwardly and inwardly inclined terminal for engaging the wheel-rim at one edge, the legs of said U-shaped member being bifurcated, the resultant furcations having coincident adjusting apertures, and a lever pivoted at one end to one leg of said U-shaped member with its other end working between the bifurcated portions of the other leg thereof, said lever having an arm with one end arranged to engage a flanged edge of the tire of the wheel, and means to effect engagement between said adjusting apertures and said lever.

In testimony whereof I affix my signature in presence of two witnesses.

CLARENCE M. MILLS.

Witnesses:
J. S. MORSE, Jr.,
G. A. STOECKER.